(12) United States Patent
Jevaney (10) Patent No.: US 8,128,327 B2
(45) Date of Patent: Mar. 6, 2012

(54) ADJUSTABLE BULKHEAD (76) Inventor: Fred Jevaney, Elmhurst, IL (US)

( * ) Notice: Subject to any disclaimer, the term of this patent is extended or adjusted under 35 U.S.C. 154(b) by 505 days.

(21) Appl. No.: 12/287,634

(22) Filed: Oct. 10, 2008

(65) Prior Publication Data

US 2010/0092264 A1    Apr. 15, 2010

(51) Int. Cl.
B60P 7/08 (2006.01)
(52) U.S. Cl. .................. 410/129; 410/118; 52/800.1
(58) Field of Classification Search .................. 410/117, 410/118, 119, 122, 123, 124, 127, 128, 129, 410/140, 145, 149, 151, 154; 220/529, 530, 220/535, 551; 296/24.35, 24.4, 24.41; 52/800.1, 52/783.1, 784.15; 160/40
See application file for complete search history.

(56) References Cited

U.S. PATENT DOCUMENTS

| | | | |
|---|---|---|---|
| 3,212,459 A | 10/1965 | Morris | 105/376 |
| 3,336,069 A * | 8/1967 | Bayer et al. | 410/87 |
| 3,449,879 A | 6/1969 | Bloom | 52/309 |
| 4,294,563 A | 10/1981 | Kilburn | 405/132 |
| 4,459,821 A | 7/1984 | Cabell et al. | 62/239 |
| 4,726,196 A | 2/1988 | Zajic | 62/239 |
| 4,887,437 A | 12/1989 | Fenton et al. | 62/186 |
| 4,981,003 A | 1/1991 | McCarthy | 52/309.7 |
| 5,215,288 A | 6/1993 | Lyon | 254/133 |
| 5,217,184 A * | 6/1993 | Hararat-Tehrani | |
| 5,265,389 A | 11/1993 | Mazzone et al. | 52/309.7 |
| 5,450,977 A | 9/1995 | Moe | 220/467 |
| 5,700,118 A | 12/1997 | Bennett et al. | 410/113 |
| 5,820,114 A | 10/1998 | Tsai | 267/202 |
| 5,934,741 A | 8/1999 | Beukers et al. | 296/181 |
| 6,092,472 A | 7/2000 | Thoman et al. | 105/404 |
| 6,106,205 A * | 8/2000 | Haire | 410/113 |
| 6,138,580 A | 10/2000 | Thoman | 105/396 |
| 6,167,624 B1 | 1/2001 | Lanahan et al. | 29/897.32 |
| 6,203,419 B1 | 3/2001 | Onken | 454/118 |
| 6,626,753 B2 | 9/2003 | Onken | 454/118 |
| 6,742,974 B2 | 6/2004 | Haire | 410/115 |
| 6,923,610 B2 * | 8/2005 | Nelson et al. | 410/130 |
| 7,048,886 B2 | 5/2006 | Nelson et al. | 264/310 |
| 7,100,972 B2 | 9/2006 | Booher | 296/186.1 |
| 7,249,921 B2 | 7/2007 | McMahon et al. | 410/129 |
| 7,296,846 B2 | 11/2007 | Booher | 296/186.1 |
| 2003/0024189 A1 | 2/2003 | Hughes et al. | 52/271 |
| 2006/0265985 A1 | 11/2006 | Nichols | 52/309.8 |
| 2007/0227086 A1 | 10/2007 | Beavers et al. | 52/309.7 |

OTHER PUBLICATIONS

Search Report for corresponding International Application No. PCT/US2009/059161 dated Nov. 20, 2009.
PCT Written Opinion from PCT/US2009/059161 dated Apr. 12, 2011.

* cited by examiner

Primary Examiner — Stephen Gordon
(74) Attorney, Agent, or Firm — Brinks Hofer Gilson & Lione (57) ABSTRACT An adjustable bulkhead is disclosed. The adjustable bulkhead includes a compressible section that may be compressed in order to change the height or width of the bulkhead.

16 Claims, 6 Drawing Sheets

SECTION C-C

DETAIL D

FIGURE 7

ADJUSTABLE BULKHEAD

FIELD OF THE INVENTION

The present invention relates to bulkheads that have an adjustable height or width.

BACKGROUND OF THE INVENTION

Bulkheads are used in trailers and the like to divide the trailer into separate storage compartments and, sometimes, to maintain each compartment at a temperature necessary to preserve the goods during transport. Frequently, the bulkheads are movable to allow a trucker to adjust the size or configuration of the individual compartments.

Movable bulkheads must be sufficiently strong to withstand the rigors of routine daily use, shifting loads during transit and potentially damaging lifts and trolleys that are used to load and unload products from the trailer. It is also desirable for a user to be able to adjust the height of a bulkhead.

SUMMARY OF THE INVENTION

An adjustable bulkhead is provided. The bulkhead includes two substantially rigid sections and a compressible section disposed between the two substantially rigid sections. The height or width of the bulkhead may be adjusted by compressing the compressible section.

DETAILED DESCRIPTION OF THE DRAWINGS

A bulkhead 1 will be described first (FIGS. 1-3) and then the adjustable version of a bulkhead 49 (FIGS. 4-7) will be described thereafter. The general construction and configuration of bulkhead 1 may be used or incorporated in the adjustable bulkhead 49.

Figure 1:
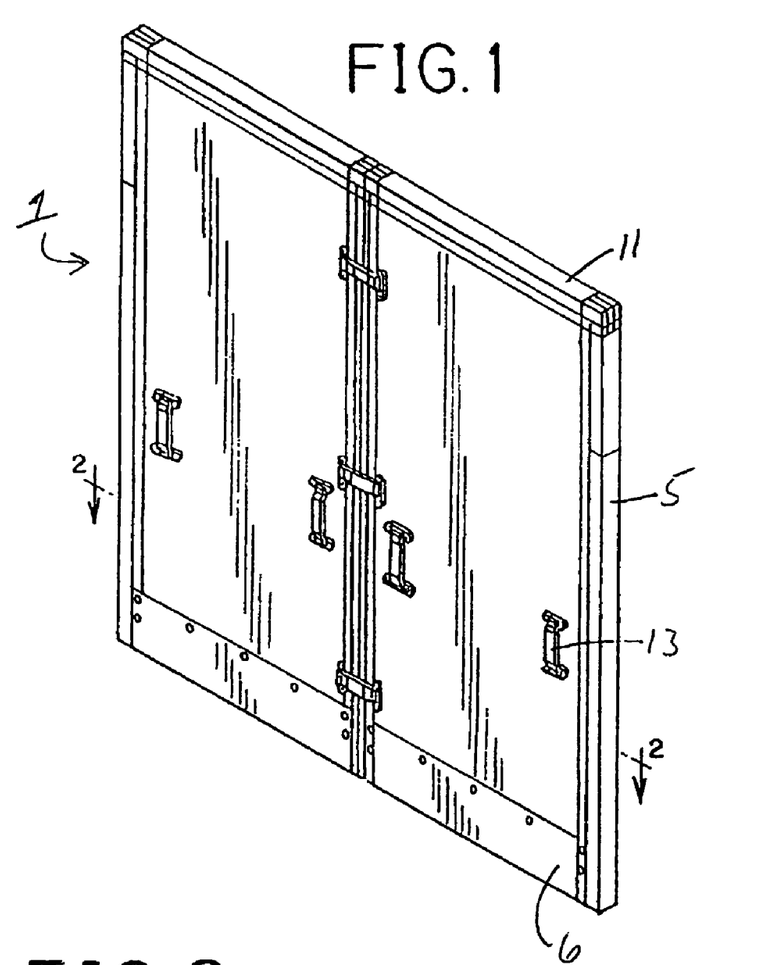
FIG. 1 is a front elevational view of a reinforced bulkhead.

A bulkhead 1 is shown in FIG. 1. The bulkhead 1 has front and back sides and four edges. The bulkhead has a vertical length and a horizontal width. The bulkhead 1 includes bumpers 5 around the periphery of the bulkhead. The bumpers 5 provide a resilient and deformable seal between the edge of the bulkhead and the structure adjoining the bulkhead, such as the floor, ceiling, walls or another bulkhead. The bulkhead 1 also includes a kick plate 6. Kick plate 6 is a rugged plate that protects the bulkhead 1 from damage in the course of ordinary use, such as damage caused by carts or trolleys when loading and unloading goods from the trailer. In a preferred embodiment, the kick plate 6 is made of an ultra high molecular weight polyethylene. The kick plate may be attached to the bulkhead 1 using any known fastening system, including screws or adhesive.

The bulkhead 1 may also include straps 13. The straps 13 provide a handhold for raising or lowering the bulkhead between the closed (vertical) position and the open (horizontal) position. The straps 13 may be attached to the bulkhead using any acceptable means of attachment, such as a bolt through the strap and bulkhead that is secured with a nut.

Figure 2:
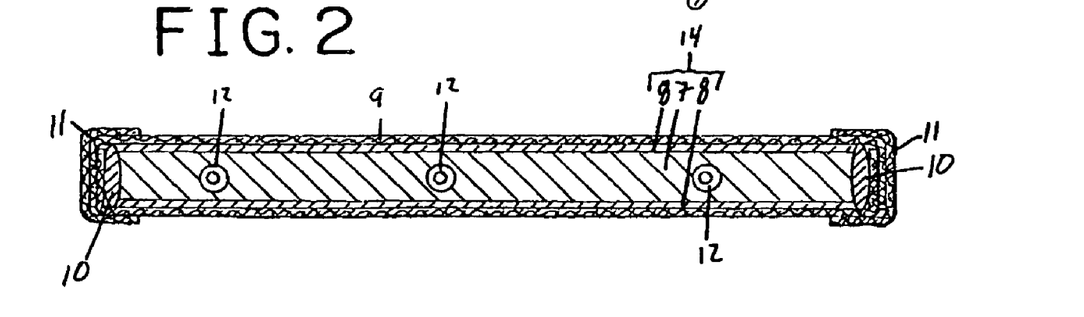
FIG. 2 is a horizontal cross-section view of a reinforced bulkhead taken across line 2-2 shown in FIG. 1.
Figure 3:
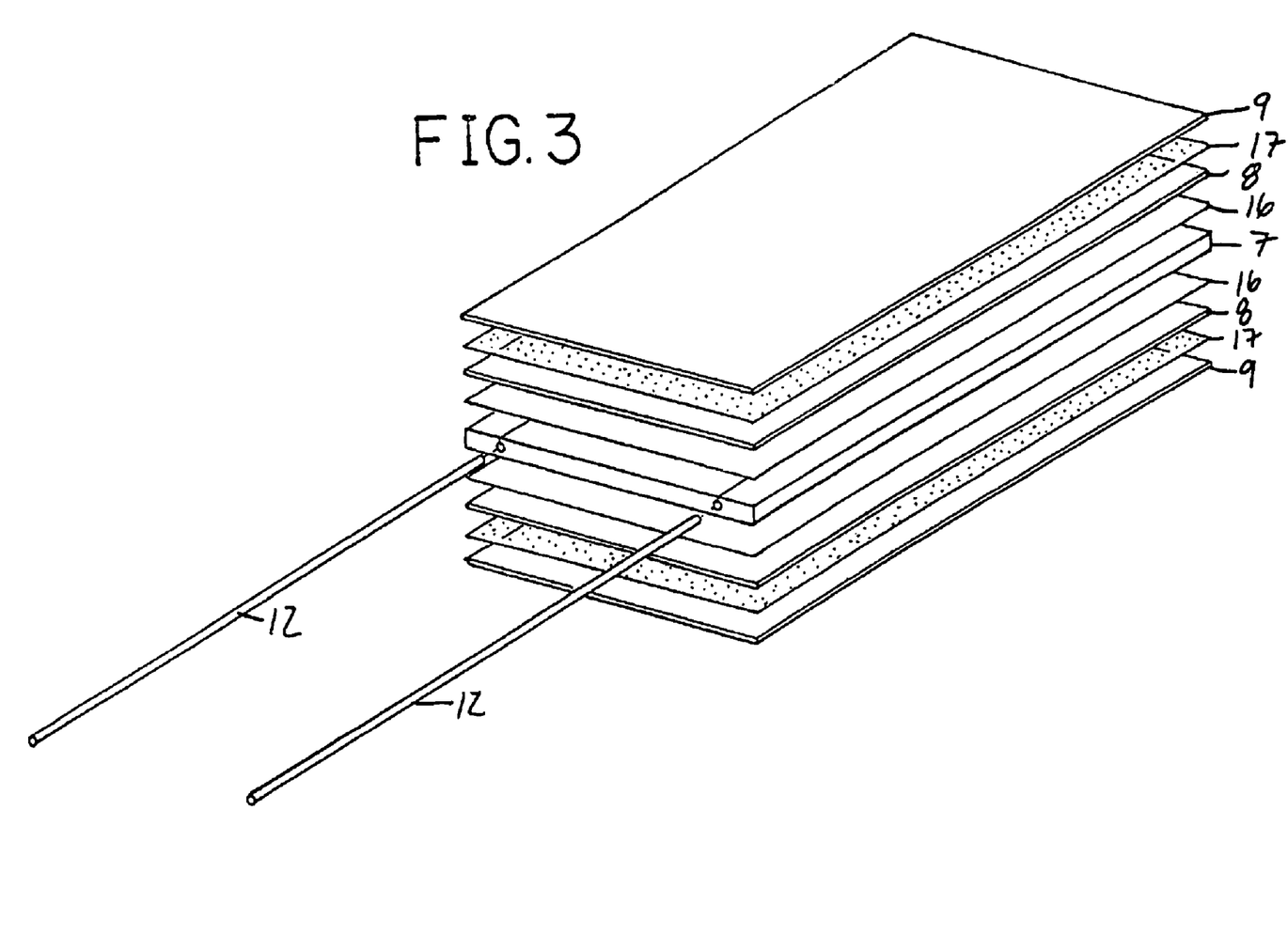
FIG. 3 shows the pre-assembled layers of a reinforced bulkhead.

FIG. 2 shows a cross-section of the finished bulkhead of FIG. 1 and shows the construction of the preferred bulkhead 1 in greater detail. FIG. 3 shows a cross-section of the pre-assembled layers of a preferred bulkhead. The bulkhead 1 includes a bulkhead core 14. The preferred bulkhead core 14 includes a central layer 7 and outer layers 8. While a three layer core is shown in FIG. 2, any number of layers may be used in the present invention. In a preferred embodiment, the bulkhead core is approximately 48 inches wide, 108 inches long, and 3 inches thick.

Materials that are suitable for the layers of the bulkhead core are well known in the art. Any such material is acceptable for use in the present invention. For bulkheads that may be used to divide refrigerated compartments, it is desirable that the material for the bulkhead core have good insulating properties so that the finished bulkhead provides an effective thermal barrier between compartments. By way of example, preferred materials for the bulkhead core include closed or open cell foams that are made from a polymeric material such as polystyrene, polyurethane, polyethylene, polypropylene, or expandable rubber.

In a preferred embodiment, the central layer 7 is made of a closed cell foam made of expandable polystyrene and it has a thickness of approximately two and one-half inches.

The outer layers 8 are preferably made from a different material than the central layer 7 and are thinner than the center layer 7. It is also desirable that the outer layers have a hardness that is lower than the hardness of the central layer 7. In a preferred embodiment, the outer layers 8 are made of a polyethylene foam.

The outer layers 8 may be attached to the center layer 7 with a sheet of hot melt adhesive 16, as shown in FIG. 3. Such hot melt adhesives are well known in the art. An exemplary hot melt adhesive is commercially available from BOSTIK under the tradename 2571B.

The preferred bulkhead 1 shown in FIGS. 1 and 2 also includes a protective skin 9. Like the bulkhead core, materials for the protective skin 9 are well known in the art and any one of the materials known in the art is acceptable for use in the present invention, including acrylonitrile butadiene styrene, reinforced vinyl, a composite mesh of fiberglass and polyethylene or polypropylene and woven polyethylene. The protective skin 9 may be a woven polymeric material. In a preferred embodiment, the protective skin 9 is made of 18 ounce vinyl.

The protective skin 9 may be attached to the bulkhead core 14 using any acceptable means of attachment, including adhesive or hot melt technology. Preferably, the protective skin 9 and the outer layers 8 are made of the same or similar material (i.e., both are polyethylene or both are vinyl) and the two structures are bonded together using hot melt technology. Alternatively, film adhesive polyethylene 17 may be used, as shown in FIG. 3. A preferred film adhesive is a 2 mil film that is commercially available from DOW CHEMICAL under the tradename INTEGRAL 801.

The preferred bulkhead 1 shown in FIGS. 1 and 2 also includes bumpers 5. The bumpers 5 provide a resilient, deformable seal between the bulkhead and the walls, floor, ceiling and/or adjacent bulkheads. Bumper constructions are well known in the art and any one of the constructions is acceptable for use in the present invention. In the preferred embodiment shown in FIG. 2, the bumper 5 includes bumper material 10 that may be made of any acceptable material, such as a synthetic, loose-fill material such as flexible polyethylene or urethane foam. The bumper material 10 may be attached to the edge of the bulkhead core with pressure sensitive glue.

The bulkhead 1 shown in FIGS. 1 and 2 also include a protective wrap 11. The protective wrap 11 is applied to the edges of the bulkhead 1 and protects the bulkhead 1 from abrasive wear and tear during the ordinary use of the bulkhead 1. The protective wrap preferably consists of a durable, wear-resistant material, such as vinyl, polyethylene and nylon. The protective wrap is preferably heat sealed to the bulkhead, but alternatively may be attached with an adhesive or any other suitable means of attachment. If the protective wrap 11 is to be heat sealed to the bulkhead, it is preferable that the protective wrap 11 and the skin 9 be made of the same or similar material (i.e., both are polyethylene or both are vinyl).

The bulkheads of the present invention may include rods 12. The rods 12 may be made of any acceptable material. Preferably, the rods strengthen and/or stiffen the finished bulkhead 1. By way of example, the rods 12 may be constructed of fiberglass, carbon fiber, wood, metal (e.g., steel or aluminum) or plastic (e.g., polyvinylchloride, polycarbonate). In a preferred embodiment, the rods 12 are constructed of fiberglass. The rods 12 may be hollow or solid. Preferably, the rods 12 are hollow. The rods 12 may have a circular, square or any other shape cross-section. Preferably, the rods 12 have a circular cross-section and have an outer diameter of approximately one inch and an inner diameter of approximately 0.855 inch.

The rods 12 are located inside the bulkhead core 14. Preferably, the rods 12 span the length of the bulkhead core and are spaced equally across the width of the bulkhead core. Alternatively, the rods 12 may span the width of the bulkhead core and be spaced equally across the length of the bulkhead core. It should be understood that the rods 12 need not span the entire width or the entire length of the bulkhead core from edge to edge. Instead, the ends of the rods 12 may be recessed from the edges of the bulkhead core. As yet another alternative, the ends of the rods may protrude slightly from the bulkhead core 14.

The bulkheads of the present invention may be used in any number of well-known bulkhead systems. Exemplary systems include, for example, the trolley and rail system shown in U.S. Pat. No. 4,639,031 or U.S. Pat. No. 2,866,419. In order to be used in such a system, the bulkhead must be capable of being attached to the rail system. Accordingly, the side of the bulkhead that is attached to the rail system may have a slightly different shape with cut-outs for accommodating the mounting equipment. The bulkhead may also have equipment attached to, or integrally molded with, the bulkhead in order to attach the bulkhead to the rail system.

A preferred method of manufacturing the bulkheads of the present invention will now be described. The method described below relates to the preferred bulkhead described above, however, it should be understood that the method may be adapted for use in manufacturing other bulkhead embodiments. The center layer of the bulkhead core is cut to the desired shape. The outer layers of the bulkhead core are then attached to the center layer with sheets of hot melt adhesive.

One or more cavities may be formed in the bulkhead core to accommodate the rods, if present. The cavities may be formed using a hot knife or by boring a hole in the bulkhead core with a drill or coring machine. A rod is then inserted into each cavity after it is formed. The rods may be secured in the cavity using an adhesive, such as a synthetic rubber adhesive. In a preferred embodiment, if a hollow tube is used, a plug is placed in each end of the tube.

Alternatively, the cavity may be formed and the rod may be inserted into the bulkhead at the same time in a single step. This is accomplished by using the rod to form the cavity. This may be done by sharpening the ends of the rod and then pushing the sharpened end of the rod, preferably with rotation, through the bulkhead core. Alternatively, a drill bit-like plug may be inserted into one end of the rod. The rod with the drill bit-like plug is then rotated and advanced into the bulkhead core so that the rod acts like a drill bit and the cavity is created as the rod is advanced into the bulkhead core.

After the bulkhead core is formed and the rods are inserted into the core, the bulkhead may be trimmed to a particular size and shape. The bulkhead may have to be trimmed because bulkheads do not come in a standard size and shape; rather, the size and shape of the bulkhead varies according to the particular trailer and bulkhead configuration for each customer. The bulkhead may be trimmed using any acceptable means, such as a band saw.

After the bulkhead core 14 is trimmed to the desired size and shape, the skin 9 is applied to the front and back sides of the bulkhead core. The skin 9 may be attached using a sheet of adhesive film. Alternatively, the skin 9 may be attached to the bulkhead core by applying sufficient temperature and pressure to the skin so that the skin 9 and outer layers 8 of the bulkhead core partially melt and form a fusion bond. The skin 9 that is applied to the front and back sides of the bulkhead core 14 is preferably longer and wider than the dimensions of the bulkhead core 14 so that there is extra material that can be folded around the bumper material, as described below After the skin 9 is attached to the bulkhead core, the bumper material 10 is placed around the periphery of the bulkhead core and secured to the edges of the core with pressure sensitive glue. The extra skin 9 that extends beyond the edges of the bulkhead core 14 is then folded around the bumper material 10.

The protective wrap 11 is then applied to the edges and wrapped around the bumper material 10. The protective wrap 11 is attached to the bulkhead using adhesive, such as a synthetic rubber adhesive, to form the finished bulkhead.

Finally, extra features and structures, including the kick plate 6 and straps 13, may be attached to the bulkhead using bolts, screws, adhesives or any other anchor that provides a strong connection between the structure and the bulkhead.

An adjustable bulkhead will now be described with reference to FIGS. 4-7. The adjustable bulkhead 49 includes features that allow the end-user to adjust the height or width of the bulkhead. Adjustable bulkheads are useful, for example, in wedge trailers where the height of the trailer is shorter in the front of the trailer than it is in the back of the trailer.

Figure 4:
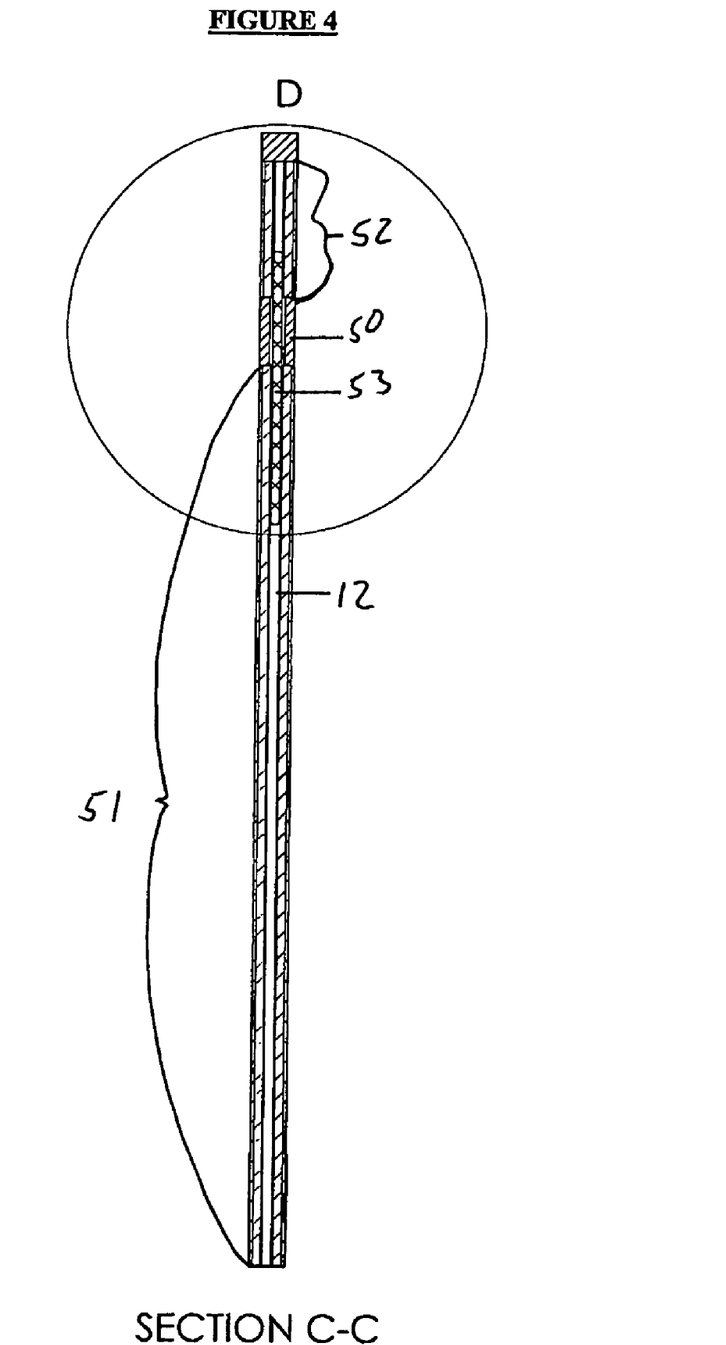
FIG. 4 shows a vertical cross section of an adjustable bulkhead of the present invention taken across line C-C shown in FIG. 5.
Figure 5:
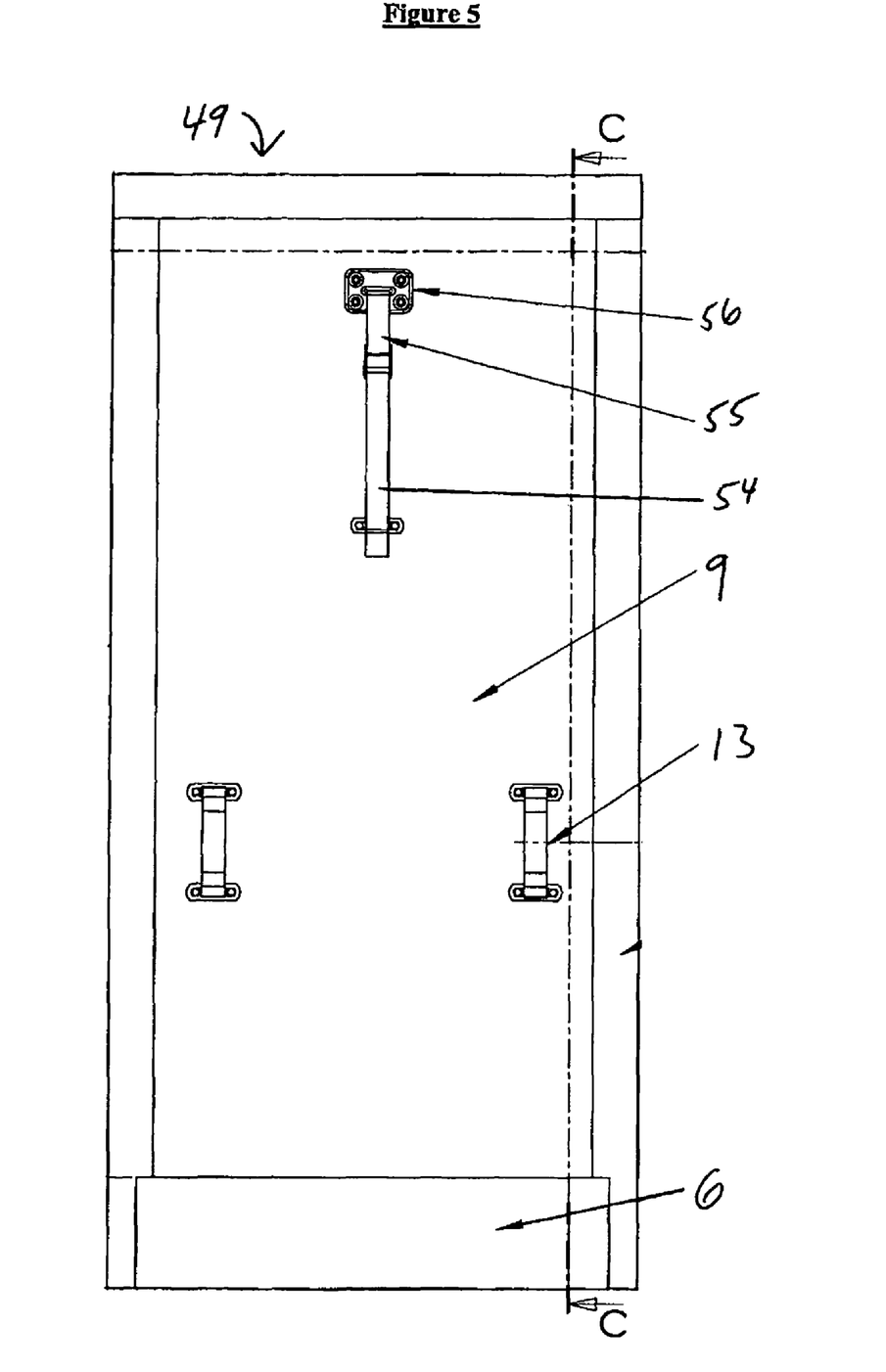
FIG. 5 shows a front elevational view of an adjustable bulkhead of the present invention.

In the preferred embodiment, the bulkhead 49 includes a compressible section 50 that may be compressed in order to create a shorter bulkhead or released in order to create a full-height bulkhead. The compressible section 50 is located between a first substantially rigid section 51 and a second substantially rigid section 52. A "substantially rigid" section is a section that has enough structural strength and integrity for the bulkhead to perform its intended function of separating cargo areas. Rigid sections 51 and 52 may be made and constructed consistent with the embodiments described above, for example in FIG. 3. Specifically, the rigid sections 51 and 52 comprise a core 14 that consists of a central layer 7 and outer layers 8 and, optionally, hollow reinforcing rods 12.

The rigid sections 51 and 52 are, essentially, two portions of a bulkhead core 14 that has been cut widthwise.

The compressible section 50 may be made of any material or structure that is deformable and substantially elastic. The compressible section 50 should be capable of being compressed in order to create a shorter bulkhead and capable of returning to its original shape in order to restore the bulkhead to its original height. In a preferred embodiment, the compressible section is a rectangular block of urethane foam. Preferably, the foam has a density of about 0.5 pounds per cubic foot to about 0.75 pounds per cubic foot.

Figure 6:
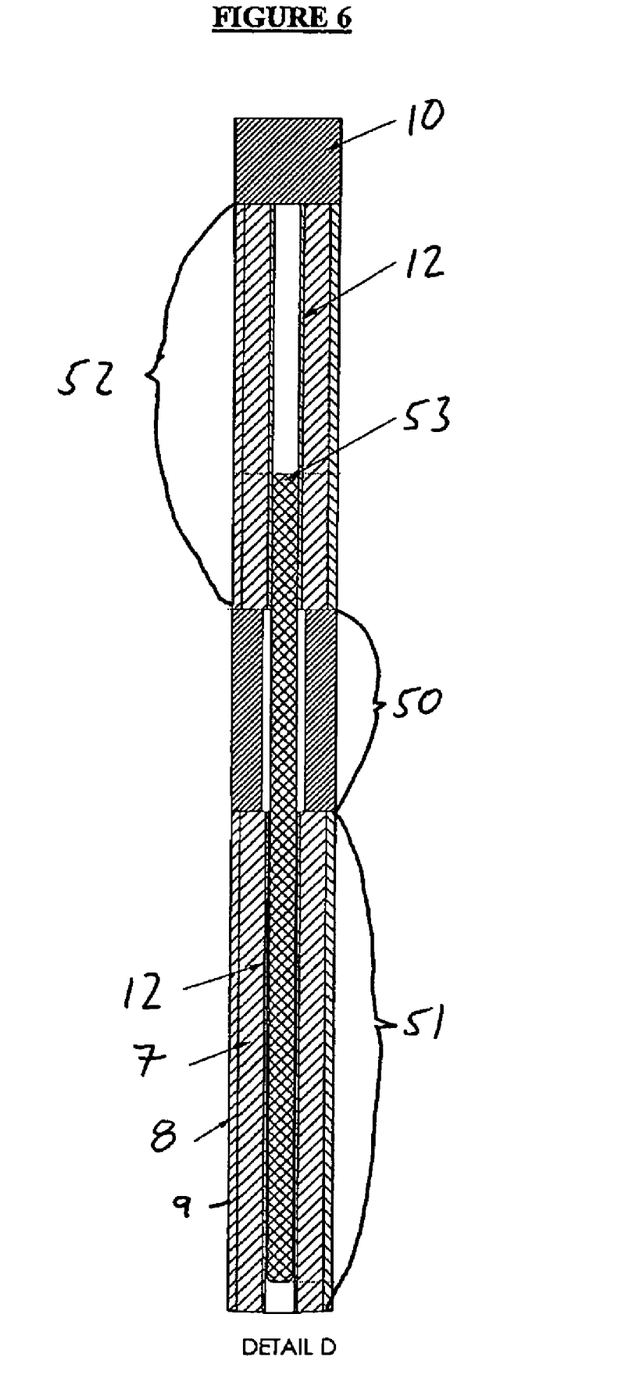
FIG. 6 shows a vertical cross section of an upper portion of an adjustable bulkhead of the present invention shown as Detail D in FIG. 4.
Figure 7:
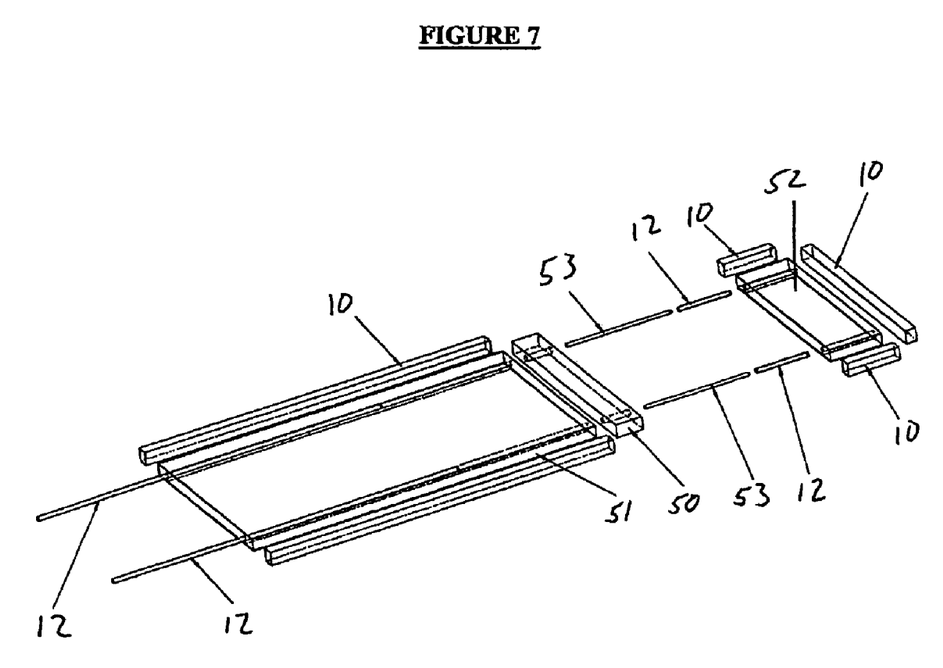
FIG. 7 shows the pre-assembled layers and components of a bulkhead core of an adjustable bulkhead of the present invention.

The compressible section 50 shown in FIGS. 6 and 7 includes two holes that pass there through and are aligned with the hollow rods 12 in the rigid sections. A rod 53 extends through each hole in the compressible section 50 and the ends of the rod 53 are disposed in the hollow rods 12 in the rigid sections 51 and 52. Preferably, the rod 53 is a solid fiberglass rod and it is secured inside the rigid section 52 with an adhesive. The rods 12 and 53 help keep the compressible section 50 and rigid sections 51 and 52 vertically aligned and act as guide rails on which the sections can move when the height of the bulkhead 49 is adjusted. In a preferred embodiment, the tubes in the rigid sections are collinear. Alternatively, the tubes in the rigid sections may be staggered. If the tubes are staggered, then there would need to be an additional set of holes in the compressible section 50 and an additional set of rods 53.

FIG. 7 shows the unassembled components of the core of an adjustable bulkhead 49. The components are assembled as described above with reference to FIGS. 1-3 and covered with protective wrap 11, also as described above.

The adjustable bulkhead 49 may include an adjustment strap 54 and self-locking cam buckle 55. The adjustment strap 54 and self-locking cam buckle 55 may be attached to the bulkhead 49 using carriage bolts and suitable brackets 56, or any other acceptable means of attachment. The adjustment strap 54 is routed through the buckle 55. The adjustable bulkhead is at its full height when the compressible section 50 is not compressed. In order to shorten the bulkhead, the adjustment strap 54 is pulled through the self-locking buckle. As the strap is pulled, the rigid section 52 is pulled downward and it compresses the compressible section 50 to create a shortened bulkhead. When the buckle 55 is released and the strap 54 is allowed to move through the buckle, the compressible section 50 returns to its original, uncompressed state and the bulkhead returns to its full height.

Alternatively, other mechanisms for compressing the compressible section 50 and/or securing it in place may be used. As a further alternative, the adjustable bulkhead 49 may not include any mechanism for compressing the compressible section. Instead, the adjustable bulkhead 49 may be force fit into the desired location, thereby using the ceiling and floor to compress the compressible section, where it is held in the compressed state. When the adjustable bulkhead is removed from its location, the compressible section automatically expands to its original shape and returns the bulkhead to its original height.

The bulkhead 49 that is shown in FIGS. 4-7 has an adjustable height. It should be understand that the adjustable bulkhead may alternatively, or additionally, have an adjustable width. In order to provide a bulkhead with an adjustable width, then the compressible section would be oriented vertically rather than horizontally.

It is intended that the foregoing detailed description be regarded as illustrative rather than limiting, and that it be understood that it is the following claims, including all equivalents, that are intended to define the spirit and scope of this invention.

The invention claimed is:

1. A bulkhead comprising:
   a. a first substantially rigid section;
   b. a second substantially rigid section; and,
   c. a compressible section;
   wherein the bulkhead is defined by a vertical length, a horizontal width, and a thickness, the vertical length and the horizontal width being greater than the thickness of the bulkhead;
   wherein the compressible section is located between the first substantially rigid section and the second substantially rigid section;
   wherein the compressible section is compressible along the vertical length or the horizontal width; and,
   wherein the bulkhead further comprises a rod, wherein a portion of the rod is disposed in the compressible section, a portion of the rod is disposed in the first substantially rigid section and a portion of the rod is disposed in the second substantially rigid section.

2. The bulkhead of claim 1, wherein the rod is secured inside the first substantially rigid section with adhesive.

3. The bulkhead of claim 1, wherein the compressible section comprises a material that is substantially elastic.

4. The bulkhead of claim 1, wherein the compressible section is capable of returning to an original shape after being compressed.

5. The bulkhead of claim 1, wherein the compressible section comprises urethane foam.

6. The bulkhead of claim 1, further comprising a mechanism for compressing the compressible section.

7. The bulkhead of the claim 1, further comprising a strap and a buckle.

8. The bulkhead of claim 7, wherein the strap is attached to the first substantially rigid section and the buckle is attached to the second substantially rigid section.

9. The bulkhead of claim 7 wherein a dimension of the bulkhead may be adjusted by pulling the strap through the buckle.

10. The bulkhead of claim 7 wherein the compressible section may be compressed by pulling the strap through the buckle.

11. A bulkhead comprising:
    a. a first substantially rigid section having a bottom edge;
    b. a second substantially rigid section having a top edge; and,
    c. a compressible section;
    wherein the compressible section is located between the bottom edge of the first substantially rigid section and the top edge of the second substantially rigid section; and,
    wherein the bulkhead further comprises a rod, wherein a portion of the rod is disposed in the compressible section, a portion of the rod is disposed in the first substantially rigid section and a portion of the rod is disposed in the second substantially rigid section.

12. The bulkhead of claim 11, wherein the rod is secured inside the first substantially rigid section with adhesive.

13. The bulkhead of claim 11, wherein the compressible section is capable of returning to an original shape after being compressed.

14. The bulkhead of claim 11, further comprising a mechanism for compressing the compressible section.

15. The bulkhead of the claim 14, wherein the mechanism for compressing the compressible section comprises a strap and a buckle, wherein the strap is attached to the first substantially rigid section and the buckle is attached to the second substantially rigid section.

16. A bulkhead comprising:
  a. a first substantially rigid section;
  b. a second substantially rigid section; and,
  c. a compressible section;
  wherein the bulkhead is defined by a vertical length, a horizontal width, and a thickness, the vertical length and the horizontal width being greater than the thickness of the bulkhead;
  wherein the compressible section is located between the first substantially rigid section and the second substantially rigid section;
  wherein the compressible section is compressible along the vertical length or the horizontal width; and,
  wherein the first substantially rigid section includes a hollow rod and the second substantially rigid section includes a hollow rod, wherein the hollow rods of the first and second substantially rigid sections are axially aligned and at least a portion of a solid
  rod is disposed in each of the hollow rods and the compressible section.

* * * * *